(12) United States Patent
Carter et al.

(10) Patent No.: US 10,146,882 B1
(45) Date of Patent: *Dec. 4, 2018

(54) SYSTEMS AND METHODS FOR ONLINE MATCHING USING NON-SELF-IDENTIFIED DATA

(71) Applicant: EHARMONY, INC., Los Angeles, CA (US)

(72) Inventors: Steve Carter, Pasadena, CA (US); Emily Maywood, Los Angeles, CA (US); Vaclav Petricek, Los Angeles, CA (US)

(73) Assignee: EHARMONY, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,356

(22) Filed: May 31, 2017

Related U.S. Application Data

(63) Continuation of application No. 14/613,298, filed on Feb. 3, 2015, now Pat. No. 9,684,725, which is a continuation-in-part of application No. 13/564,349, filed on Aug. 1, 2012, now Pat. No. 8,984,065.

(51) Int. Cl.
*G06F 17/30* (2006.01)

(52) U.S. Cl.
CPC .... *G06F 17/30867* (2013.01); *G06F 17/3053* (2013.01); *G06F 17/30528* (2013.01)

(58) Field of Classification Search
CPC ........ G06Q 50/01; G06Q 30/02; G06Q 10/10; G06Q 30/08; G06F 17/30657; G06F 17/30572; H04W 4/206; H04L 29/12594; H04L 61/301; H04L 61/3085; H04L 63/0421; H04L 65/1069; H04L 67/28; H04L 67/306

See application file for complete search history.

(56) References Cited

U.S. PATENT DOCUMENTS

| | | |
|---|---|---|
| 6,272,467 B1 | 8/2001 | Durand et al. |
| 7,451,079 B2 | 11/2008 | Oudeyer |
| 7,454,357 B2 | 11/2008 | Buckwalter et al. |
| 7,613,706 B2 | 11/2009 | Terrill et al. |
| 7,676,466 B2 | 3/2010 | Terrill et al. |
| 8,010,556 B2 | 8/2011 | Terrill et al. |
| 8,051,013 B2 | 11/2011 | Terrill et al. |

(Continued)

OTHER PUBLICATIONS

"Apple Looking to deliver a little More Buzz to iOS Devices", Mar. 22, 2012, retrieved from http://www.patentlyapple.com/patently-apple/2012/03/apple-looking-to-deliver-a-little-more-buzz-to-ios-devices.html on Feb. 3, 2015, pp. 1-10.

(Continued)

*Primary Examiner* — Ninos Donabed
(74) *Attorney, Agent, or Firm* — ONE LLP; Joseph K. Liu

(57) ABSTRACT

An electronic process for presenting interpersonal relationship analysis includes: receiving recorded responses of a plurality of users to selected stimuli, such recorded responses comprising indications of traits and preferences that are not explicitly identified in the recorded response; generating match profile data at least partially from the response; and presenting potential matches to a first user based on a compatibility score generated from correlating match profile data of the plurality of users with the match profile data of the first user.

16 Claims, 7 Drawing Sheets

(56) References Cited

U.S. PATENT DOCUMENTS

| | | | |
|---|---|---|---|
| 8,332,418 B1 | 12/2012 | Giordani et al. | |
| 8,780,221 B2 | 7/2014 | Kaneda | |
| 8,782,038 B2 | 7/2014 | Mishra et al. | |
| 9,122,759 B2 | 9/2015 | Carter | |
| 9,158,821 B1 | 10/2015 | Quisel et al. | |
| 9,449,282 B2 | 9/2016 | Diaz et al. | |
| 2004/0210661 A1 | 10/2004 | Thompson | |
| 2007/0072468 A1 | 3/2007 | Terrill et al. | |
| 2007/0073549 A1 | 3/2007 | Terrill et al. | |
| 2009/0164132 A1 | 6/2009 | Jung et al. | |
| 2009/0164302 A1 | 6/2009 | Jung et al. | |
| 2009/0164401 A1 | 6/2009 | Jung et al. | |
| 2009/0164403 A1 | 6/2009 | Jung et al. | |
| 2009/0164458 A1 | 6/2009 | Jung et al. | |
| 2009/0164464 A1* | 6/2009 | Carrico | G06F 17/30657 |
| 2009/0164503 A1 | 6/2009 | Jung et al. | |
| 2009/0164549 A1 | 6/2009 | Jung et al. | |
| 2009/0171164 A1* | 7/2009 | Jung | A61B 5/04842 600/300 |
| 2009/0172540 A1 | 7/2009 | Jung et al. | |
| 2009/0267758 A1* | 10/2009 | Hyde | A61B 5/0002 340/539.12 |
| 2009/0271120 A1* | 10/2009 | Hyde | G06F 19/326 702/19 |
| 2009/0312595 A1* | 12/2009 | Leuthardt | G06F 19/3456 600/27 |
| 2009/0318773 A1 | 12/2009 | Jung et al. | |
| 2010/0015583 A1* | 1/2010 | Leuthardt | G06F 19/3456 434/236 |
| 2010/0022820 A1* | 1/2010 | Leuthardt | G06F 19/3456 600/27 |
| 2010/0077032 A1 | 3/2010 | Drennan et al. | |
| 2010/0163035 A1* | 7/2010 | Hyde | G06F 19/00 128/203.14 |
| 2010/0168525 A1* | 7/2010 | Hyde | G06F 19/00 600/300 |
| 2010/0174586 A1 | 7/2010 | Berg et al. | |
| 2012/0311032 A1* | 12/2012 | Murphy | G07F 17/3225 709/204 |
| 2013/0095929 A1 | 4/2013 | Wilson | |
| 2013/0232213 A1* | 9/2013 | Bustamente | H04W 4/21 709/206 |
| 2013/0238708 A1* | 9/2013 | Bustamente | H04W 4/21 709/204 |

OTHER PUBLICATIONS

"Future iPhones May Incorporate Smart Haptics", Mar. 31, 2011, retrieved from http://www.patentlyapple.com/patently-apple/2011/03/future-iphones-may-incorporate-smart-haptics.html on Feb. 3, 2015, pp. 1-7.

"Feeling Machines: Engineers Develop Systems for Recognizing Emotion", Apr. 15, 2008, retrieved from http://www.sciencedaily.com/releases/2008/04/080412175657.htm on Feb. 3, 2015, pp. 1-4.

"Is Apple Considering Next-Gen Tactile Feedback for iOS Devices?", Aug. 2, 2010, retrieved from http://www.patentlyapple.com/patently-apple/2010/08/is-apple-considering-next-gen-tactile-feedback-for-ios-devices.html on Feb. 3, 2015, pp. 1-6.

\* cited by examiner

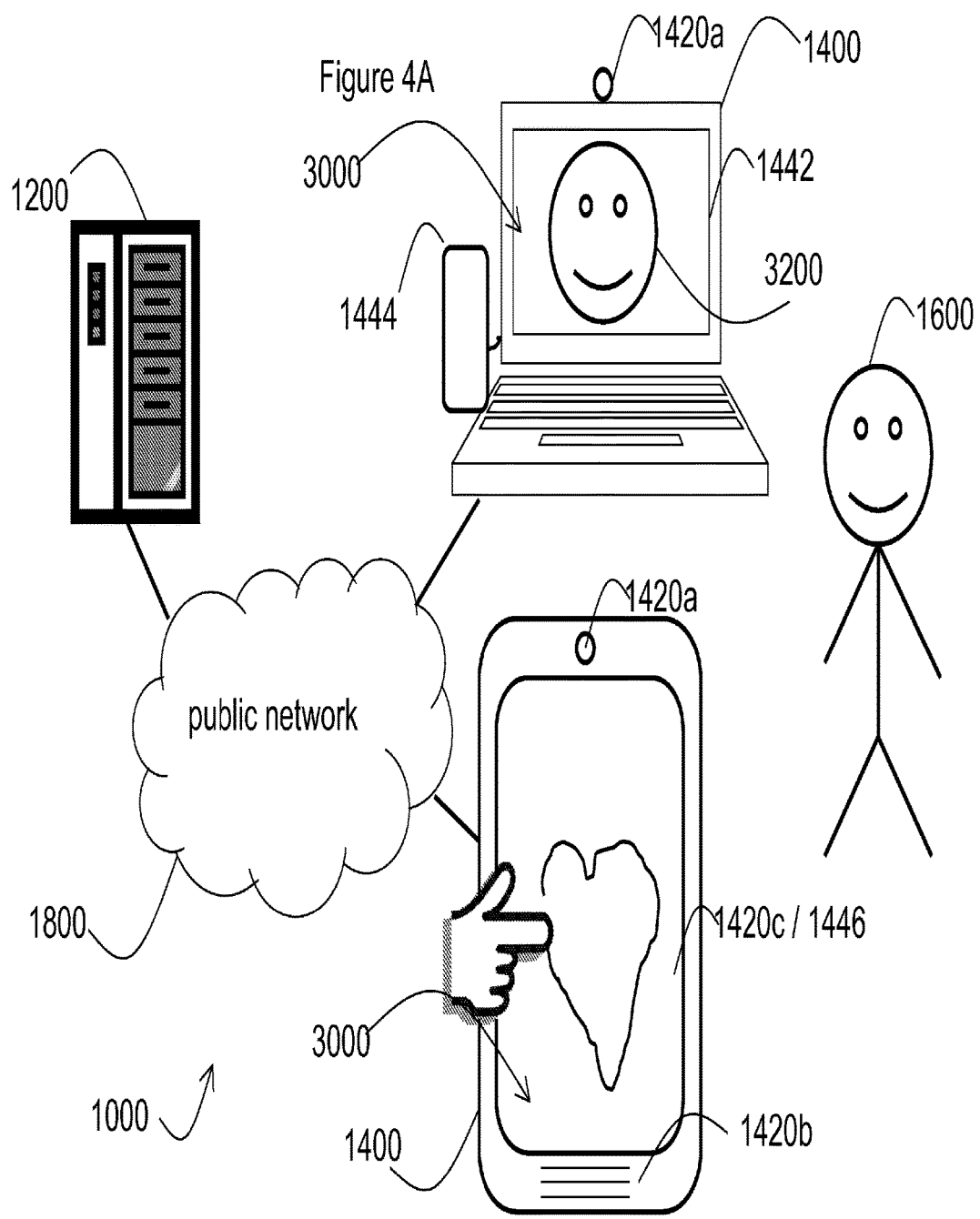

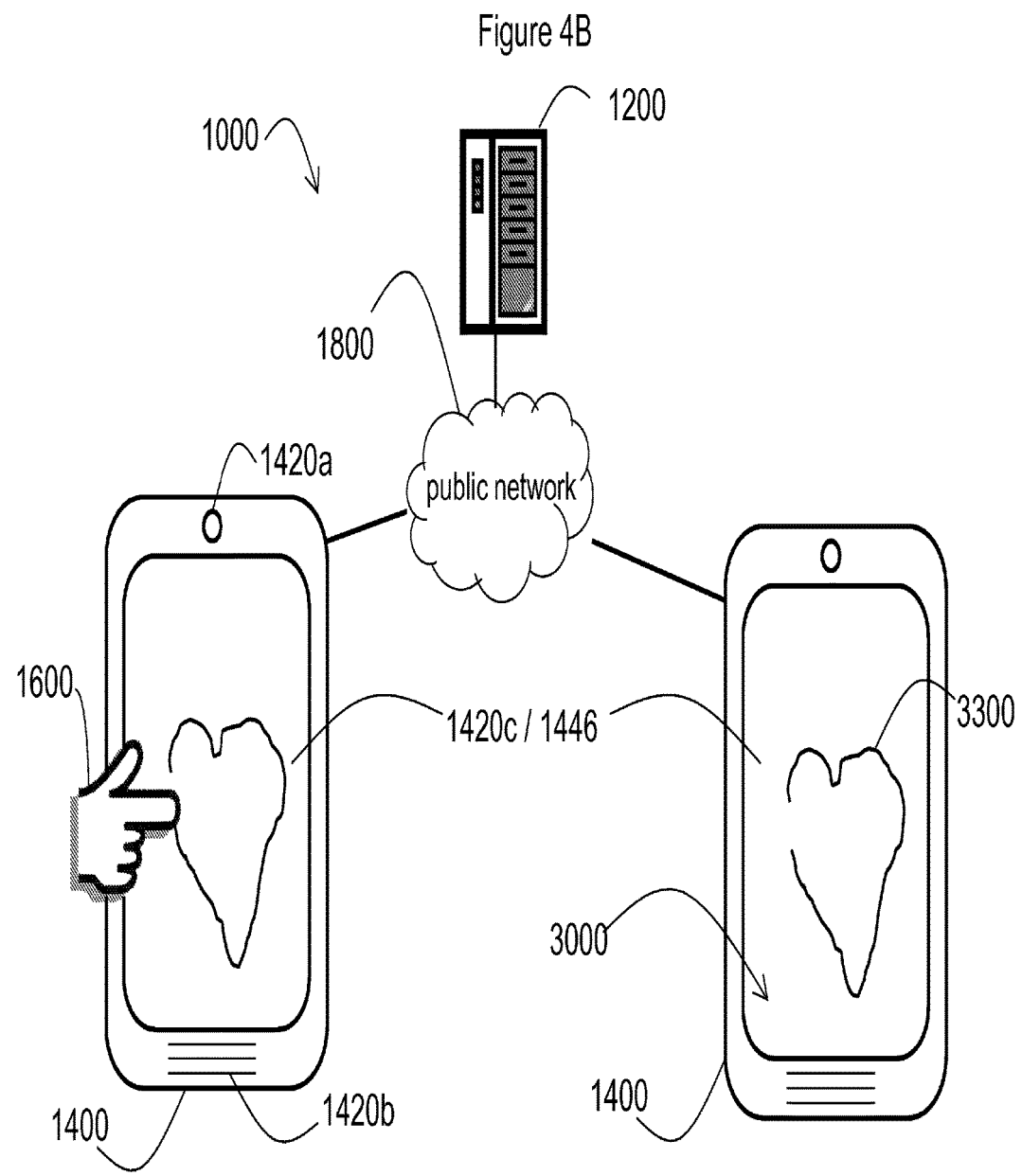

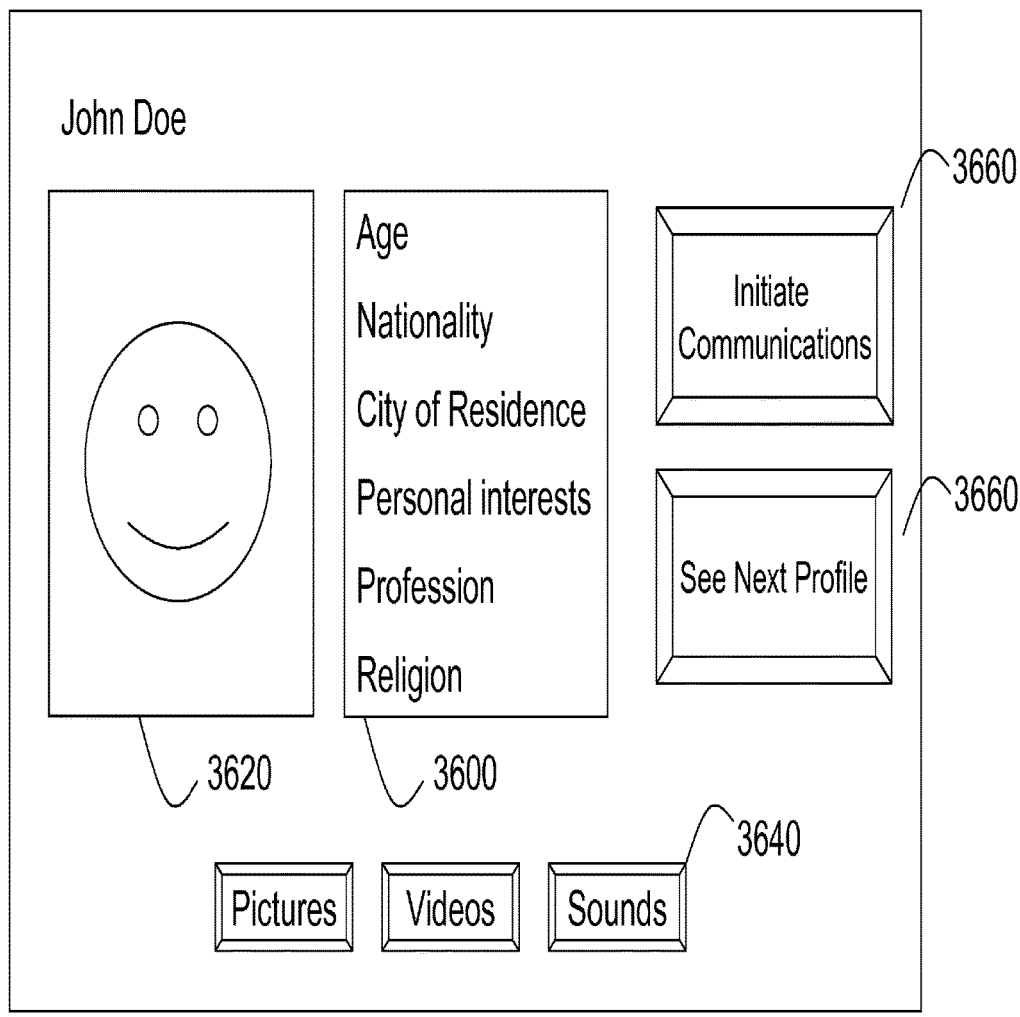

SYSTEMS AND METHODS FOR ONLINE MATCHING USING NON-SELF-IDENTIFIED DATA

CROSS-REFERENCE TO RELATED APPLICATIONS

The present application is a continuation of U.S. patent application Ser. No. 14/613,298, filed Feb. 3, 2015, which is a continuation of U.S. patent application Ser. No. 13/564,349, filed Aug. 1, 2012, now U.S. Pat. No. 8,984,065, both of which are incorporated herein by reference in their entireties for all purposes.

FIELD OF THE INVENTION

The field of the invention relates to systems and methods for operation of a matching service, and more particularly to systems and methods that enable online matching using non-self-reported data.

BACKGROUND OF THE INVENTION

Research has shown that the success of human interpersonal relationships depends on complex interactions between a large number of variables including, but not limited to, personality, socioeconomic status, religion, appearance, ethnic background, energy level, education, interests and appearance. Matching services have developed effective systems that analyze these variables to identify and match people who have the potential to establish a successful relationship. A well-known example of such a service is eHarmony, Inc. (which can be found at www.eharmony.com). A matching service generally collects and stores data to create a "profile" for each user. The profile includes a number of factors potentially relevant to establishing a successful interpersonal relationship with that user. The matching service then correlates that user's profile with others in its database to assess which profiles are compatible, i.e., which users have the potential for a successful relationship when matched.

The variables used by these matching services are generally self-identified—i.e. users are required to explicitly indicate the existence and/or extent of interests, traits, qualities and/or preferences that they identify in themselves or that they desire in a potential match. For example, a user may be required to indicate his or her preference for action movies on a scale of 1-5, or whether he or she desires a smoker or non-smoker. While such self-identified forms data are useful, additional insight may be gained from non-self-identified forms of data to assess whether a prospective match may have the potential to establish a successful relationship. Accordingly, alternative systems and methods for facilitating interpersonal relationships may be desirable.

SUMMARY OF THE INVENTION

The field of the invention relates to systems and methods for operation of a matching service.

In a preferred embodiment, the system includes a matching server system, operatively coupled to a public network. The matching server system is configured to receive recorded responses of a plurality of users to selected stimuli and to generate match profile data therefrom, the recorded responses including at least responses indicating traits or preferences that are non-self identified.

Other systems, methods, features and advantages will be apparent to one of ordinary skill in the art from the following figures and detailed description, which illustrate, by way of example, the principles of the present invention.

BRIEF DESCRIPTION OF THE DRAWING(S)

Illustrated in the accompanying drawing(s) is at least one of the best mode embodiments of the present invention. In such drawing(s):

FIG. 4A is an exemplary diagram of a user interface in accordance with a preferred embodiment of the present invention;

FIG. 4B is an exemplary diagram of a user-to-user interface in accordance with a preferred embodiment of the present invention;

FIG. 5 is an exemplary diagram of stimuli presentation in accordance with a preferred embodiment of the present invention.

DETAILED DESCRIPTION OF THE PREFERRED EMBODIMENTS

The above described drawing figures illustrate the invention in at least one preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Matching System

Figure 1:
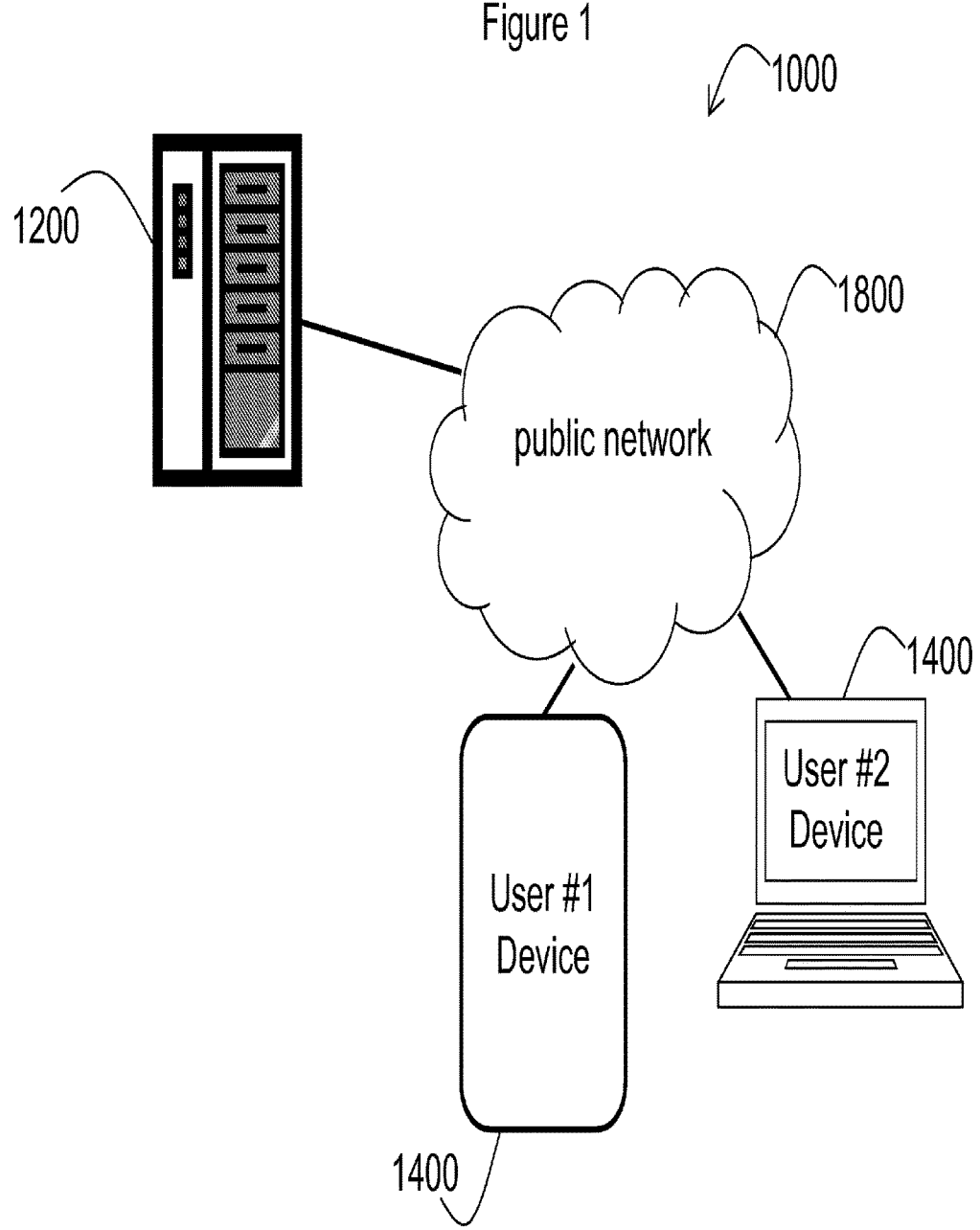
FIG. 1 is an exemplary diagram of an online interpersonal match system in accordance with a preferred embodiment of the present invention.

FIG. 1 shows a computer-based compatibility matching system 1000 in accordance with a preferred embodiment of the present invention. The system generally includes a matching server system 1200, which may be distributed on one or more physical servers, each having processor, memory, an operating system, and input/output interface, and a network interface all known in the art, and a plurality of end user interface devices 1400 coupled to a public network 1800, such as the Internet and/or a cellular-based wireless network.

Figure 2:
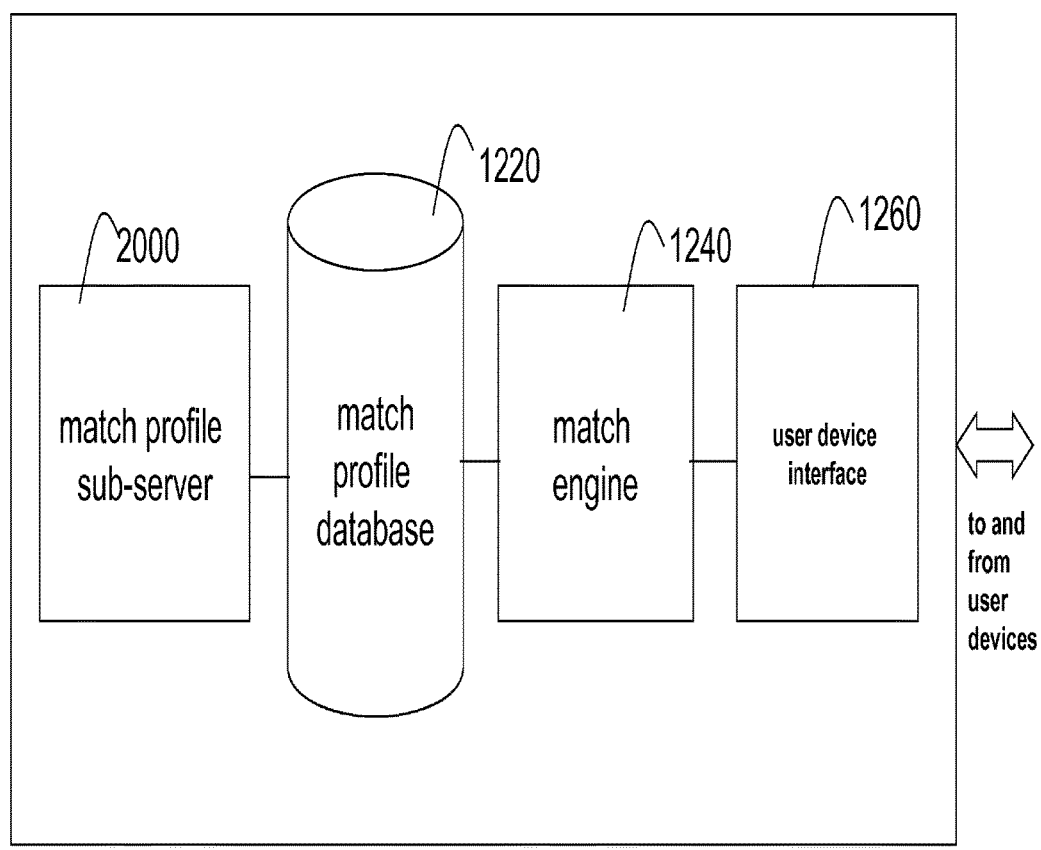
FIG. 2 is an exemplary diagram of a matching system server in accordance with a preferred embodiment of the present invention.

An exemplary embodiment of the matching server system is shown in FIG. 2. The matching server system generally includes a computer application designed to match end users who have the potential to establish a successful interpersonal relationship. To obtain potential matches, each user establishes a "match profile" that includes data and factors potentially relevant to establishing a successful interpersonal relationship with that user. These factors can be organized into three major categories (1) physical attraction;

(2) interpersonal interests, traits and preferences that are self-identified, such as hobbies, geographical location, occupation, and sexual orientation; and (3) deep psychological traits and preferences, such as curiosity and interests that may not be self-identified. These factors are generated from empirical data collected from the user. An exemplary approach to establishing a match profile for a user is described in detail in U.S. Pat. No. 7,454,357, issued to J. Galen Buckwalter et al. on Nov. 18, 2008, which is hereby incorporated by reference in its entirety ("the Buckwalter patent").

These match profiles are stored in a match profile database 1220 and organized by the user's match profile identification ("ID"). In the process of creating potential matches for a particular user, a match engine 1240 queries the user's match profile by its respective ID, and correlates that profile with other profiles to calculate a compatibility value. If two profiles generate a compatibility value that meets a predefined threshold, then there is potential for the two respective users to have a satisfactory and/or successful interpersonal relationship if matched. This calculation can also incorporate data based on a user's previous history of matches and satisfaction rate as well as the history of other users with comparable empirical data, thereby enabling a feedback system that allows the system to "learn" how to optimize the correlation calculation. This process can also involve developing and utilizing a "neural network" to resolve problems in complex data. Details of this calculation and correlation process and the neural network are also described in the Buckwalter patent, which describes an exemplary compatibility value in the form of a "satisfaction index."

Preferably, the match engine is configured to generate more than one compatibility value between two or more correlated match profiles, where each compatibility value is associated with a different type of relationship, e.g., dyadic, romantic, friendship, business, social, recreational, team oriented, long-term, or short term (e.g., minutes, hours, days, or months). Each type of relationship may involve the correlation of different factors and/or different weighting of factors from the various categories described above.

Empirical Data Used to Generate Profile

As discussed above, empirical data is used in generating the user's match profile that is correlated with other match profiles to calculate a compatibility value indicating the likelihood of satisfaction with the resulting relationship if the respective users are matched. Generally, this empirical data consists of user responses to survey inquiries or other stimuli.

Self-Identified Responses

As discussed above, the stimuli may be a series of questions or statements to which the user can indicate a level of preference or agreement. The user's responses to the stimuli provide empirical data used in generating the user's match profile. Generally, such responses will be active responses. As used herein, an active response refers to an explicit indication of the existence and/or the extent of interests, traits, qualities and/or preferences that the user may associate with themselves or that may or may not be desired in a potential match, i.e. the substance of the active response is intentionally presented by the user. For example, a user may be required to indicate his or her preference for action movies on a scale of 1-5, or whether he or she desires a smoker or non-smoker. The user's active response is then used as empirical data to generate the user's match profile which will include the user's fondness for action films and/or whether the user desires a potential match who is or is not a smoker.

Non-Self-Identified Responses

The stimuli may also elicit passive responses from the user. As used herein, a passive response includes all responses that are not active responses, and refers to any non-explicit indication of the existence and/or extent of interests, traits, qualities and/or preferences that the user may associate with themselves or that may or may not be desired in a potential match. Such responses may include, but are not limited to, one or more of: body language, paralanguage, kinesthetic (i.e. carrying out the response, such as by producing an artifact engaging in an activity) and/or biological responses. For example, instead of being required to explicitly indicate whether he/she enjoys action films or desires a non-smoker, the user may be required to view a short clip of an action film, or an image of a smoker. The user's passive response may include, for example, body language indicating enjoyment of the action film or disgust at the smoker. The user's passive response is then used as empirical data to generate the user's match profile which will include the user's fondness for action films and his/her desire for a non-smoker in a potential match. In this manner, the passive response empirical data may provide additional depth to user profiles, and may improve the accuracy of profile correlation and calculated compatibility values.

As discussed above, the compatibility value of users is derived at least partially from correlating their match profiles generated from the gathered empirical data. In order to promote the accuracy of the compatibility value, it is preferable that the responses making up the empirical data be accurate indications of interests, traits, qualities and/or preferences. To facilitate accurate responses, both active and passive responses are preferably spontaneous or genuine user responses. Thus, in at least one preferred embodiment, stimuli are presented so as to elicit user responses that are unrehearsed or unpracticed.

Empirical Data from Recorded Responses

The matching server system 1200 further comprises a match profile sub-server 2000, which may be distributed on one or more physical servers, each having processor, memory, an operating system, and input/output interface, and a network interface all known in the art, coupled to the user interface devices 1400 via the public network 1800.

Figure 3:
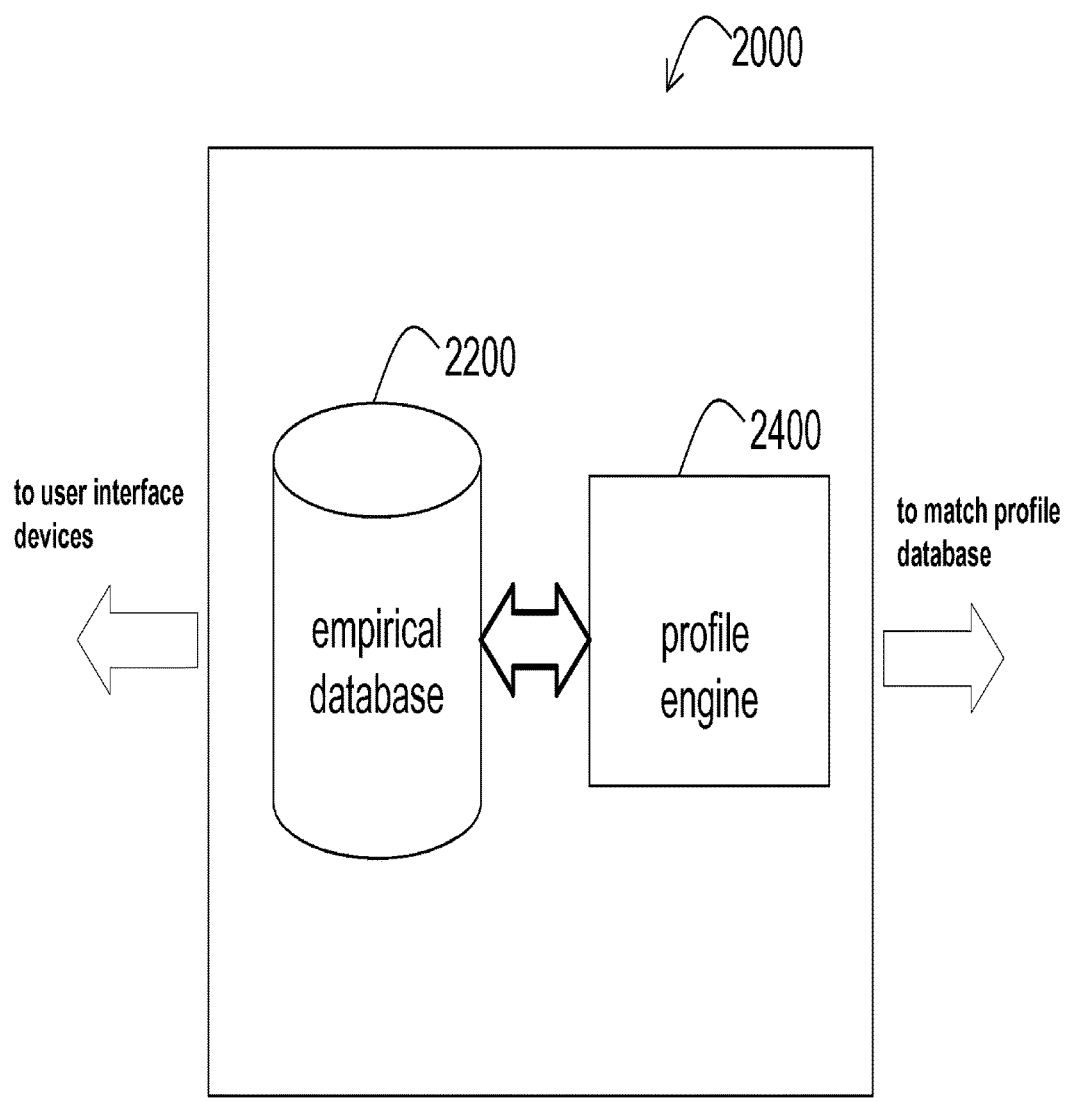
FIG. 3 is an exemplary diagram of a matching profile sub-server in accordance with a preferred embodiment of the present invention.

An exemplary embodiment of the match profile sub-server is shown in FIG. 3. The match profile sub-server generally includes a computer application designed to generate the match profiles of the plurality of users from the user's responses to presented stimuli. User responses are stored in a database 2200 and are associated with the user's match profile identification ("ID"). In the process of generating the match profile for a particular user, a profile engine 2400 queries the database for empirical data corresponding to the match profile ID. The empirical data is used to generate factors, and the match profile is generated from both factors and empirical data. As more empirical data is gathered, the engine updates the profile so that the profile evolves according to the gathered empirical data.

Recording Responses

Turning now to FIG. 4, the user interface device (UID) is preferably a personal computing device 1400, such as a tablet, laptop, desktop, PDA, or smart phone, generally coupled to a recording device 1420.

On experiencing the presented stimuli, the user's response is recorded via the recording device. Recording user responses may include recording one or more of: body language, paralanguage, kinesthetic responses (i.e. physically carrying out the response, such as by producing an artifact engaging in an activity) and/or biological responses. The recorded response may be a live recording that is transmitted directly to the server via the public network, or it may be stored on the UID for later transmission. The server may then store the recorded responses on one or more physical memories.

As discussed above, these recorded responses preferably provide empirical data indicating not only the user's self-identified traits and preferences, but also his/her deep psychological traits and preferences.

Exemplary embodiments according to the present invention relating to the recording of user responses will now be described with reference to FIG. 4.

The response of a user 1600 to presented stimuli may be visually recorded by, for example, a camera 1420a coupled to the UID. Such responses include all types of user responses that may be visually recorded, including but not limited to, one or more of: facial expressions, body language, certain types of kinesthetic responses (e.g. dancing to a preferred song, etc.) and certain types of biological responses (e.g. pupil dilation, etc.). The profile engine generally includes a computer application that utilizes recognition software, such as facial recognition software or the like, to obtain the empirical data associated with the visually recorded response. An exemplary approach to emotive facial recognition systems is described in detail in U.S. patent application Ser. No. 12/936,227, filed by Yuji Kaneda on Mar. 31, 2009, which is hereby incorporated by reference in its entirety. Such visually gathered empirical data may be utilized in generating the user's match profile, as described above.

Further, the response of a user 1600 to presented stimuli may be audio recorded by, for example, a digital audio recorder 1420b coupled to the UID. Such responses include all types of user responses that may be audio recorded, including but not limited to, one or more of: verbal communication (e.g. speech and/or other vocally produced sounds) and paralanguage (e.g. tone, stress, pitch, rhythm, volume, and/or quality, etc.). The profile engine generally includes a computer application that utilizes recognition software, such as emotive speech recognition software or the like, to obtain the empirical data associated with the audio recorded response. An exemplary approach to emotive speech recognition systems is described in detail in U.S. Pat. No. 7,451,079, issued to Pierre-Yves Oudeyer on Nov. 11, 2008, which is hereby incorporated by reference in its entirety. As with the above described visually gathered empirical data—and in combination therewith—the audio gathered empirical data may be utilized in generating the user's match profile, as described above.

Still further, the response of a user 1600 to presented stimuli may be recorded by, for example, a haptic interface 1420c coupled to the UID. Such responses include all types of user responses that may be recorded via haptic feedback, including but not limited to, one or more of: certain types of biological responses (e.g. changes in pulse, perspiration, body temperature, etc.), and certain types of kinesthetic responses (e.g. changes in magnitude and location of pressure applied to a touch-screen display, etc.). The profile engine generally includes a computer application that utilizes recognition software, such as haptic recognition software or the like, to obtain the empirical data associated with the touch recorded response. Exemplary approaches to utilization of haptic recognition systems are described in detail in online publications: http://www.patentlyapple.com/patently-apple/2011/03/future-iphones-may-incorporate-smart-haptics.html, and http://www.sciencedaily.com/releases/2008/04/080412175657.htm, which are hereby incorporated by reference in its entirety. As with the above described visually and audio gathered empirical data—and in combination therewith—the touch gathered empirical data may be utilized in generating the user's match profile, as described above.

Moreover, the response of a user 1600 to presented stimuli may be recorded by, for example, a device monitoring computer application operating in connection with the UID. Such recorded responses include all types of user responses that may be recorded via device monitoring software, including but not limited to, one or more of: activities conducted via the UID (e.g. participation in a virtual game, interaction with a web page, access of a file, entry of text, selection of an icon, etc.), GPS location data, data transmissions. The profile engine generally includes a computer application that utilizes recognition software to obtain the empirical data associated with the recorded response. An exemplary approach to computer device monitoring systems is the commercially available Spector Pro product, described in online publication: http://www.netbus.org/spectorpro.html, which is hereby incorporated by reference in its entirety. As with the above described visually, audio, and haptic interface gathered empirical data—and in combination therewith—the device monitoring gathered empirical data may be utilized in generating the user's match profile, as described above.

Presenting Stimuli

As shown in FIG. 4, the UID may be further operable to present the stimuli to the user 1600 in such a manner so as to elicit the user's response for recording. Thus, the UID preferably comprises one or more of: a video display 1442, an audio speaker 1444, and a haptic interface 1446; and a user interface 3000. The user interface 3000 that is part of a computer application on the UID (e.g. a downloaded webpage) configured to operatively communicate with the matching server system via the public network and, in combination with the video display, audio speaker and haptic interface, to present stimuli to the user. Thus, stimuli presented to the user via the UID may include one or more of audio, visual and/or haptic stimuli. Additionally, such stimuli may be presented by (and may include) a programmable avatar or live or pre-recorded proctor 3200 configured to emulate conversational interaction with the user.

The user interface may present live or pre-recorded audio/visual stimuli, which may be, for example, a musical, audio-visual, or written work, a question, joke or statement, a photograph, painting or other work of art, an artifact or other article of manufacture, or any combination thereof. Additionally, the audio-visual stimuli may be related to one or more potential matches. For example, the audio-visual stimuli may be one or more images, videos or sound recordings of the potential matches.

The user interface may also present the user with an opportunity to perform an activity, such as playing a game or preparing an artifact (e.g. a drawing, written text, sculpture, etc.). The activity may be accomplished with the UID providing the activity forum, such as navigating a virtual maze or creating a virtual drawing, or the activity may be accomplished independent of the UID provided forum, such as performing an enjoyed activity (e.g. painting a canvas or playing an instrument) that may be recorded. As with the audio-visual stimuli, the activity producing stimuli may be related to one or more potential matches. For example, the activity producing stimuli may be the providing of a forum for an interactive game played over the public network between the user and the potential match.

Moreover, the user interface may provide a forum for live or pre-recorded interaction, such as instant messaging, video chatting, emailing, voice messaging, etc., between the user and one or more potential matches.

Finally, the user interface may present the user with tactile or touch-based stimuli, which may be, for example, a texture sensation imparted to a touch-screen by varying the electric field intensity of the screen. Exemplary approaches to generating tactile stimuli are described in online publications: http://www.patentlyapple.com/patently-apple/2010/08/is-apple-considering-next-gen-tactile-feedback-for-ios-devices.html, and http://www.patentlyapple.com/patently-apple/2012/03/apple-looking-to-deliver-a-little-more-buzz-to-ios-devices.html, which are hereby incorporated by reference in its entirety. Again, the tactile stimuli may be related to one or more potential matches. For example, the tactile stimuli may be the created sensation that the user is touching the potential match.

EXEMPLARY EMBODIMENTS

Exemplary embodiments according to the present invention relating to the presentation of stimuli will now be described.

As illustrated by diagram in FIG. 4A, in at least one embodiment, the interface presents the avatar or proctor presenting the stimuli to the user.

In one embodiment, the avatar presents a joke or series of jokes to the user. The user's response to the presented joke may include facial expressions and/or body language, such as laughter or a lack thereof. The recording device records the user's response and transmits the recorded response to the server via the public network for use by the profile engine in generating the match profile of the user. The profile engine is configured so as to identify deep psychological traits and preferences from the recorded response. Thus, the profile engine may recognize the laughter as genuine and the empirical data obtained as indicating something about the user's sense of humor. The empirical data may then be used to more accurately generate the user's match profile.

In one embodiment, the avatar presents a topic for discussion by the user. The user's responsive discussion of the topic may include various forms of paralanguage and the avatar may be programmed to emulate conversation in a manner that encourages further discussion of the topic by the user. The recording device records the user's response (including paralanguage) and transmits the recorded response to the server via the public network for use by the profile engine in generating the match profile of the user. The profile engine being configured so as to identify deep psychological traits and preferences from the recorded response, the profile engine may recognize certain paralanguage qualities that indicate something about the user's emotional response to discussing the topic with the avatar.

As illustrated by diagram in FIG. 4A, in at least one embodiment, the interface presents a forum for creating a virtual artifact, such as a drawing. A user controlled icon is configured to move about a virtual canvas so as to create virtual shapes therein in response to user commands. Additionally, the user interface may be a haptic interface configured to respond the user's touch thereon and thereby create virtual shapes on the virtual canvas. The canvas may be a blank canvas, or may comprise an uploaded photo or other image for the user to draw over or otherwise modify. Exemplary approaches to "computer-art" are commercially available, for example, Adobe Illustrator and Microsoft Paint, which are hereby incorporated by reference in its entirety.

In one embodiment the user is presented with the drawing forum via the user interface. The user may be given a prompt, or may be permitted to draw without a prompt. The user's responsive drawing is recorded by the recording device—in the case of a touch-screen, by the haptic interface and/or the monitoring application. The recording device records the user's drawing (and its creation) and transmits it to the server via the public network for use by the profile engine in generating the match profile of the user. Through the aforementioned recognition software, the profile engine may recognize certain qualities about the drawing and/or its creation that indicate something about the user's deep psychological traits and/or preferences.

As illustrated by diagram in FIG. 4B, the provided forum may also be such that the user is interacting with a potential match during the creation of the drawing—i.e. they draw together. In such embodiment, the user interface devices of the user and the potential match are in network communication with one another. The user may utilize the haptic interface to create a drawing or other artifact 3300 on his/her virtual canvas, which will simultaneously be displayed on the virtual canvas of the potential match. Additionally, any of the potential match's alterations to the drawing will simultaneously be displayed to the user. The resulting drawing (and its creation) may provide further empirical data about the user's deep psychological and/or preferences—especially as pertaining to the potential match or others with similar match profiles.

In at least one embodiment, the multi-user interactive forum is presented as a game of Pictionary (or other interactive game) with live audio communications enabled between the user and the potential match while engaging in turn-based cooperative drawings (or other interactive game functions). As with above, the recording device, via e.g. haptic interface and/or device monitoring system, records the cooperative drawing (and its creation), and transmits it to the server via the public network for use by the profile engine in generating the match profile of the user. Additionally, the recording device, via e.g. camera 1420a and audio recorder 1420b, may record the verbal interaction and the user's facial expressions in response to the interactive game. Again, through recognition software, the profile engine may recognize certain qualities about the drawing, its creation, and/or any other aspect of the interaction between user and potential match during the interactive game that indicate something about the user's deep psychological traits and/or preferences—especially as pertaining to the potential match or others with similar match profiles.

As illustrated by diagram in FIG. 5, in at least one embodiment, the interface presents the match profile information 3600 of a potential match that may be compatible with the user. The match profile information may include a photo 3620 of the potential match, and may include interactive links 3640 which enable the user to access additional photos, videos and/or sound bites of the potential match, and interactive links 3660 which enable the user to indicate a desire (or lack thereof) to initiate communications or other interactive activity. Preferably, the additional photos, videos and/or sound bites at least partially consist of recorded responses of the potential match (i.e. a second user of the system) to presented stimuli, as described above with respect to the user.

As the user views the profile his response is recorded by the recording device for empirical data. A change in heart rate or pulse, possibly indicating physical attraction in response to an image of the potential match, may be recorded haptically, as described above; a smiling facial expression, possibly indicating mental attraction, in response to a video or audio recording of the potential match discussing a topic, may be recorded audio-visually; and a dalliance on the profile or the repeated access of images/videos/sound-bites, possibly indicating overall attraction, may be recorded by the device monitoring software. As was the case above, the recording device records these responses and transmits them to the server via the public network for use by the profile engine in generating the match profile of the user.

As mentioned above, interactive links 3660 enable the user to initiate communications or other interactive activity with the potential match. In at least one embodiment, this interactive activity is a video or audio chat, or an instant message or email exchange, conducted via the user interface and provides the presented stimuli to which the user reacts. Similar to the above, while engaging in the interactive activity, the recording device records the user's responses and transmits them to the server via the public network for use by the profile engine in generating the match profile of the user.

In at least one embodiment, the interactive activity is a web-based social networking application that couples the UID of the user to the UID of the potential match, thereby creating an exclusive network where the user and the potential match may interact to exchange images, sketches, videos, instant messages, location data, and other personal information.

The above described embodiments are primarily concerned with utilizing recorded responses to stimuli presented to the user via the UID. However, in at least one embodiment, user responses to stimuli that are not presented to the user via the UID may be recorded and transmitted to the server for use by the profile engine in generating the user's match profile.

As described above with reference to FIG. 4A, the UID is generally coupled to the recording device 1420, which may include the device monitoring application.

In at least one preferred embodiment, the device monitoring application permits the recording and transmission to the server of location data associated with the movement of the UID. The profile engine generally includes a computer application that utilizes recognition software to obtain the empirical data associated with the location data. Such empirical data preferably includes data regarding frequented locations, periods of high activity/mobility, and habits and/or traits derivable therefrom. See, "Technology." *A Brave New World*. Season 1, Episode 3. Channel 4. Oct. 31, 2011, for an exemplary approach to utilizing location data derived from mobile phones in personality profiling.

In at least one preferred embodiment, the device monitoring application permits the recording and transmission to the server of online behavior. The profile engine generally includes a computer application that utilizes recognition software known in the art to obtain the empirical data associated with recorded online behavior. Such empirical data preferably includes data regarding frequented websites, periods of high activity, and habits and/or traits derivable therefrom.

As with the above described empirical data—and in combination therewith—the empirical data gathered by device monitoring in non-stimuli-presenting capacity may be utilized in generating the user's match profile.

It will be further appreciated by one of ordinary skill in the art that any or all of the described modes for presenting stimuli and any or all of the described modes for recording responses may be utilized alone or in combination with one another without departing from the scope of this invention.

Process Steps

Figure 6:
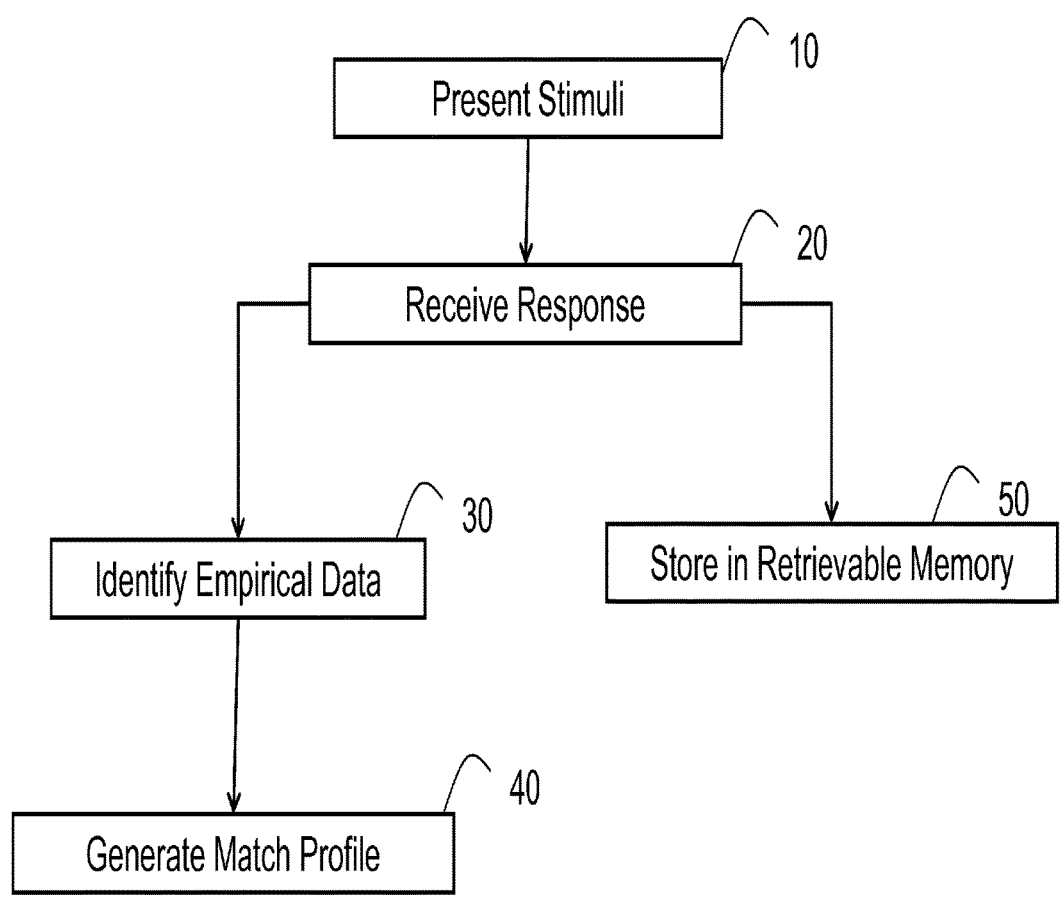
FIG. 6 is an exemplary flow-chart of a matching process in accordance with a preferred embodiment of the present invention.

Turning now to FIG. 6, an exemplary process in accordance with a preferred embodiment of the present invention is shown.

At action block 10, stimuli are presented to the user and the user response is recorded. As described in detail above, the presented stimuli are preferably such that the user response contains passive components that are non-explicit indications of traits and/or preferences, i.e. non-self identified.

At action block 20, the recorded responses are received by the matching server system that includes the aforementioned computer application designed to match users who have the potential to establish a successful interpersonal relationship in accordance with the embodiments described herein.

At action block 30, the recorded responses are analyzed to identify empirical data which which to generate factors and the user's match profile in accordance with the embodiments described herein. Empirical data is identified and associated with the match profile of the particular user giving the response and the particular stimulus eliciting the response.

At action block 40, the match profile of the user is generated based on the empirical data identified from the recorded responses. As described above, the match profile includes at least one factor potentially relevant to establishing a successful interpersonal relationship with another user that is based on the empirical data.

In addition to the recorded response being used for match profile generation, the recorded response is associated with the particular user and stimuli that produced the response and is retrievably stored in memory, at action block 50. As mentioned above, the recorded response may be retrieved from memory to be provided as stimulus to another user, e.g. by viewing it.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A computer-based system for presenting interpersonal relationship analysis and optimizing potential match recommendations for a plurality of users, comprising:
   a matching server, operatively coupled to a public network, including a processor, a match profile database storing match profiles for each of the plurality of users in non-transitory computer memory and an empirical database storing empirical data for each of the plurality of users in non-transitory computer memory; and
   a first user device, having a user interface and operatively coupled to the public network, that is configured to:
   present selected stimuli to a first user via the user interface;
   monitor at least one biological reaction to the selected stimuli from the first user;
   transmit first data based on the at least one biological reaction to the selected stimuli to the matching server;
   receive from the matching server and present, via the user interface, at least one selected potential match to the first user; and
   transmit at least one satisfaction indicator selected by the user to the matching server,
   wherein the processor of the matching server selects the at least one potential match by:
   identifying at least one non-self-reported psychological trait based on the at least one biological reaction to the selected stimuli;
   identifying a comparable user based on empirical data for the comparable user that is stored in the empirical database;
   calculating a plurality of compatibility values between the first user and the potential match using the identified non-self-reported psychological trait, empirical data for the first user and the empirical data for the comparable user, wherein each of the plurality of compatibility values is associated with a different type of relationship;
   comparing a first compatibility value of the plurality of compatibility values to a threshold;
   if the first compatibility value exceeds the threshold, selecting the potential match for presentation to the first user; and
   updating the empirical data for the first user based on the satisfaction indicator received from the first user device;
   wherein monitoring the first user's biological reaction includes monitoring the user's pulse or heart rate during stimuli presentation.

2. The system of claim 1, wherein the type of relationship comprises one of dyadic, romantic, friendship, business, social, recreational, team oriented, long-term, or short-term relationship.

3. The system of claim 2, wherein a short-term relationship comprises one of minutes, hours, days, or months.

4. The system of claim 1, wherein first user device is further configured to monitor a change in the first user's body language.

5. The system of claim 1, wherein the first user device is further configured to monitor a facial expression.

6. The system of claim 1, wherein the first user device is further configured to monitor paralanguage identified in a verbal response by the first user.

7. The system of claim 1, wherein the monitored biological reaction occurs during creation of an artifact by the first user.

8. The system of claim 1, wherein the first user device is further configured to monitor location data.

9. A computer implemented method for presenting interpersonal relationship analysis and optimizing potential match recommendations for a plurality of users via a computer network, comprising:
   instructions stored in non-transitory memory of a first user device that, when executed by a processor of the first user device, cause the processor to:
   present selected stimuli to a first user via a user interface of the first user device;
   monitor at least one biological reaction to the selected stimuli from a first user of the first user device;
   transmit first data based on the at least one biological reaction to a matching server via a communicatively coupled computer network;
   receive at least one potential match profile associated with a potential match for the first user from the matching server via the network;
   selectively present the potential match profile to the first user via the user interface; and
   transmit at least one satisfaction indicator selected by the first user to the matching server via the network based on the at least one satisfaction with the potential match,
   wherein a processor of the matching server operably executes instructions, stored in non-transitory memory of the server, that cause the server to:
   identify at least one non-self-reported psychological trait for the first user based on the received first data;
   identify a comparable user based on empirical data for the comparable user that is stored in an empirical database;
   calculate a plurality of compatibility values between the first user and the potential match using the identified non-self-reported psychological trait, empirical data for the first user and the empirical data for the comparable user, wherein each of the plurality of compatibility values is associated with a different type of relationship;
   compare the compatibility value to a threshold and if the compatibility value exceeds the threshold, transmit the potential match profile to the first user device for presentation to the first user, wherein each of the plurality of compatibility values is associated with a different and distinct type of relationship; and upon receiving the satisfaction indicator from the first user device, update the empirical data for the first user based on the satisfaction indicator, wherein the empirical database stores empirical data for each of the plurality of users in non-transitory memory of the matching server and a match profile database stores match profiles for each of the plurality of users in non-transitory memory of the matching server;

wherein monitoring the first user's biological reaction includes monitoring the user's pulse or heart rate during stimuli presentation.

10. The method of claim 9, wherein the type of relationship comprises one of dyadic, romantic, friendship, business, social, recreational, team oriented, long-term, or short-term relationship.

11. The method of claim 10, wherein a short-term relationship comprises one of minutes, hours, days, or months.

12. The method of claim 9, wherein first user device is further configured to monitor a change in the first user's body language.

13. The method of claim 9, wherein the first user device is further configured to monitor a facial expression.

14. The method of claim 9, wherein the first user device is further configured to monitor paralanguage identified in a verbal response by the first user.

15. The method of claim 9, wherein the monitored biological reaction occurs during creation of an artifact by the first user.

16. The method of claim 9, wherein the first user device is further configured to monitor location data.

* * * * *